Apr. 24, 1923.
H. DILAS
1,452,678
APPARATUS FOR REMOVING THE DIVISION PLATES FROM ICE CREAM RECEPTACLES
Filed Jan. 12, 1922
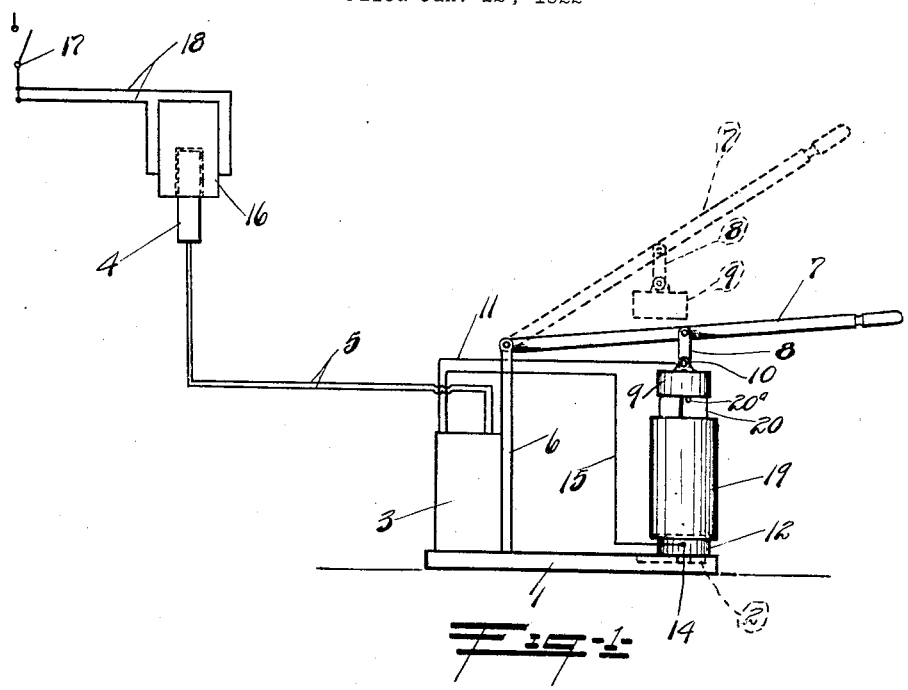
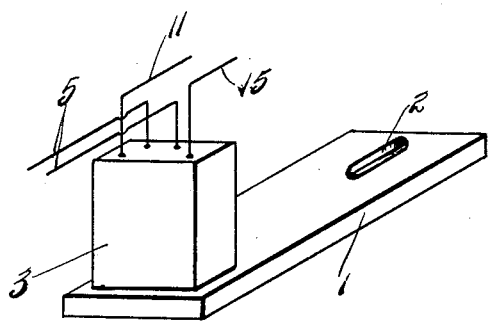
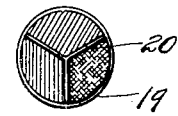
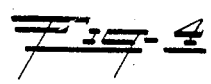
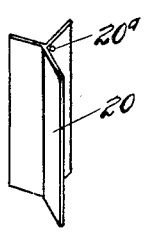
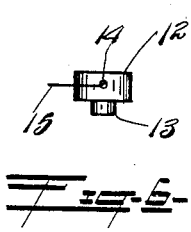
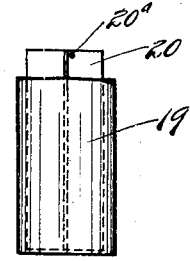
Inventor
Harry Dilas.
By Frank C. Larman
Attorney Patented Apr. 24, 1923.

1,452,678

UNITED STATES PATENT OFFICE.

HARRY DILAS, OF BAY CITY, MICHIGAN.

APPARATUS FOR REMOVING THE DIVISION PLATES FROM ICE-CREAM RECEPTACLES.

Application filed January 12, 1922. Serial No. 528,874.

*To all whom it may concern:*

Be it known that I, HARRY DILAS, a citizen of the United States of America, and a resident of Bay City, in the county of Bay and State of Michigan, have invented certain new and useful Improvements in Apparatus for Removing the Division Plate from Ice-Cream Receptacles, of which the following is a specification.

This invention relates to divisional ice cream receptacles and means for removing the division plate to allow the cream to be cut and served.

One object of the invention is to provide means for dividing the interior of a receptacle into several compartments so that a different flavor, color, or kind of ice cream may be placed in each compartment in a fluid state, and then be frozen, the division plate removed and the several kinds united in such manner that each section will be a different color, flavor or kind, but still be united together in one solid body.

Another object is to provide means for heating the division plates so that the ice cream will not adhere thereto, and allow it to be withdrawn from the receptacle without melting the body of frozen cream in each compartment.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction within the scope of the appended claims without departing from the spirit, or sacrificing any of the advantages of the invention.

In the drawing:—

Fig. 1 is a side view of my improved apparatus illustrating a container in position thereon, the handle being shown in two different positions.

Fig. 2 is an isometric view of the base plate of the apparatus illustrating the slot formed therein.

Fig. 3 is a side view of one of the containers the division plate being shown therein.

Fig. 4 is a top plan view the section lining designating different colors in each compartment.

Fig. 5 is an isometric view of the division plate.

Fig. 6 is a side view of one of the contact blocks.

Referring now particularly to the drawing in which is shown the preferred embodiment of my invention, the numeral 1 indicates a base having an elongated slotted opening 2 formed near one end thereof, this base being preferably formed of wood, and a transformer 3 is secured to the opposite end and is connected to a fuse plug 4 by means of the usual primary current wire connections 5. A standard 6 is secured to this base and a handle 7 is pivotally connected to the upper end thereof extending out and over the base member 1. A link 8 is pivotally connected to this handle intermediate its length, and a steel block 9 is pivotally attached to the end of the said link, this block being preferably made of steel, nickel plated and is provided with a terminal 10 to which the wire 11 is attached.

A similar block 12 having a reduced portion 13 is seated on the base 1, the reduced portion being seated in the slotted opening 2 and it will be obvious that the said block can be shifted longitudinally on the base to compensate for the varying heights of the containers which are designed and manufactured to hold different predetermined quantities of ice cream such as quarts, pints, etc., which are naturally of varying heights and consequently the short containers must be placed closer to the standard to compensate for the arc described by the handle as it is lowered towards the base. A terminal 14 is provided on the side of this block and is connected to the transformer by means of the wire connection 15. The transformer delivers high amperage and low voltage making the machine more safe to operate than if the circuit were high voltage. The handle together with the base are of course formed of wood or other suitable insulating material to insure and eliminate the possibility of shocks to the operator, and a conventional circuit breaker (not shown) can be provided in the primary circuit to eliminate short circuits, etc.

The plug 4 is formed with copper covered edges and is adapted to be inserted in the fuse box 16 which is connected to a switch 17 by means of the wire 18, and it will be obvious that when the switch is out as shown in Fig. 1 of the drawing, that no current passes through the machine, but when the switch is closed current will be supplied thereto.

The containers 19 are composed of the well known paper or fibre into which the division plate 20 is introduced, this is designed with a number of wings which divide the interior into distinct compartments. Prepared ice cream of different colors and flavors, and of a thick fluid consistency is placed in each compartment, and the container is then placed in the cold room for freezing, after freezing the ice cream naturally adheres to the metal wings, and it is necessary that these be heated sufficiently to melt and loosen the cream from the wings to allow them to be withdrawn, this is accomplished by placing the container on the block, the handle is then lowered bringing the other block down to contact with the top of the division plate as clearly shown in Fig. 1 of the drawing, the switch 19 is then closed, the plate 20 forming the connection between the two blocks completing the circuit the current flowing through the plate melts the particles of ice cream which adhere to it, the switch is then opened, and the handle raised and the plate can be withdrawn by hand, or with the aid of a tool inserted in the opening 20ª, the cover is then applied to the container which is again placed in the cold room for freezing the particles which have been reduced to a state of fluid consistency by the heating of the plate, when this is accomplished the different sections are solidly frozen together into one body and present a very neat and artistic appearance.

While I have shown but three blades on the division plate, it will be obvious that any suitable number may be provided, the container can also be square or of any other desired shape.

From the foregoing description it will be obvious that I have perfected a very simple and economical apparatus for making up a solid body of ice cream, distinct sections of which will be of different flavors, colors and kinds.

What I claim is:—

1. In combination with an ice cream container having a metal division plate therein, and means for directing a flow of electric current through the plate.

2. In combination with an ice cream container having a metal division plate therein, means for directing an electric current thru said plate, and comprising a transformer having a pair of blocks connected thereto, and adapted to contact with the ends of the said plate, and a switch for controlling the said current.

3. In combination with an ice cream container having a metal division plate therein, a base having a transformer mounted thereon, a slotted opening in the base and a contact block seated thereon, a handle having a similar block pivotally secured thereto and adapted to engage the division plate when a container is placed on the lower block to pass an electric current through the division plate.

4. In combination with an ice cream container having a metal division plate therein, a transformer mounted thereon, a slotted opening in the base and a block mounted thereon, and connected to the transformer, a vertically disposed standard having a handle pivotally connected thereto, and a link pivoted to the said handle and having a terminal block pivotally connected thereto, and wired to the transformer and adapted to engage the top of the division plate to form a complete circuit to heat the said plate.

5. In combination with an ice cream container having a metal division plate, a base having a longitudinally slotted opening therein, a transformer secured to the base, and connected to a source of power, a terminal block adjustably seated in the slotted opening, a standard secured to the base and a handle pivotally secured thereto, a second terminal block pivotally secured to the handle, intermediate its length, and adapted when engaging the division plate to form a circuit.

In testimony whereof, I affix my signature.

HARRY DILAS.